United States Patent [19]
Gralenski

[11] Patent Number: 5,088,773
[45] Date of Patent: Feb. 18, 1992

[54] ELECTRICALLY INSULATING PIPE COUPLING APPARATUS

[75] Inventor: Nicholas M. Gralenski, Santa Cruz County, Calif.

[73] Assignee: Watkins Johnson Company, Palo Alto, Calif.

[21] Appl. No.: 570,122

[22] Filed: Aug. 17, 1990

[51] Int. Cl.$^5$ ............................................. F16L 19/02
[52] U.S. Cl. .................................. 285/52; 285/325; 285/328; 285/353
[58] Field of Search ................ 285/52, 325, 327, 387, 285/47, 55, 328, 353

[56] References Cited

U.S. PATENT DOCUMENTS

| | | |
|---|---|---|
| 740,640 | 10/1903 | Gilbert . |
| 2,867,463 | 1/1959 | Snider ..................... 285/52 X |
| 3,574,357 | 4/1971 | Alexandra et al. .............. 285/47 |
| 4,258,944 | 3/1981 | Wendel ................... 285/387 X |
| 4,284,297 | 8/1981 | Godkin ........................ 285/47 |
| 4,519,634 | 5/1985 | Hand .......................... 285/55 |
| 4,602,809 | 7/1986 | Ross et al. ............... 285/52 X |
| 4,629,216 | 12/1986 | Pedersen ................. 285/47 X |
| 4,811,976 | 3/1989 | Yagisawa ................... 285/328 |
| 4,854,597 | 8/1989 | Leigh ..................... 285/328 X |

Primary Examiner—Dave W. Arola
Attorney, Agent, or Firm—Flehr, Hohbach, Test, Albritton & Herbert

[57] ABSTRACT

An electrically insulating pipe coupling assembly for electrically isolating pipe sections to which an electric current is applied. The apparatus includes first and second extension members formed having an integral flange with a protruding annular sealing bead at one end and adapted for attachment to a section of pipe at the other end. An insulating sleeve having an insulating flange is mounted on the first extension member. A nonconductive spacer is positioned between the opposing integral flanges to receive the annular sealing beads, separating and electrically isolating the first and second extension members. A first coupling member is slidably mounted on the insulating sleeve, while a second coupling member is slidably mounted on the second extension member. The coupling members, when secured together, force the annular sealing beads into compressive contact with the nonconductive spacer.

2 Claims, 2 Drawing Sheets

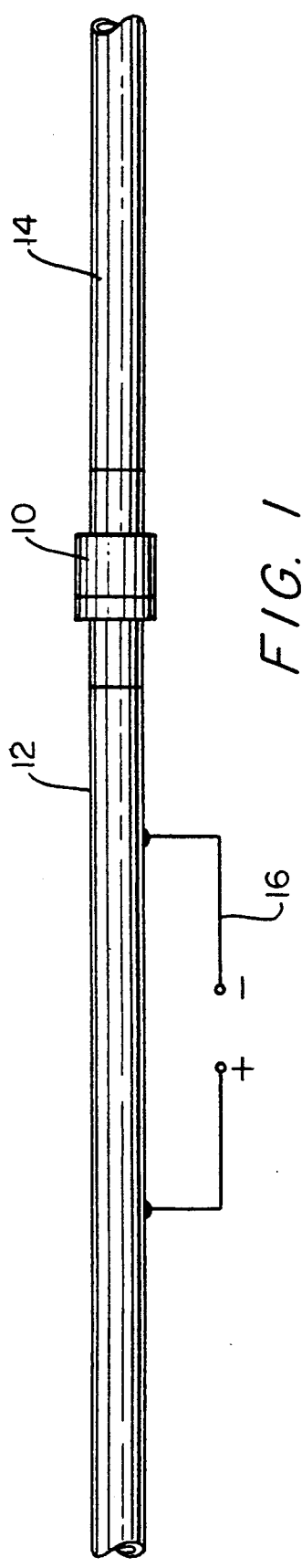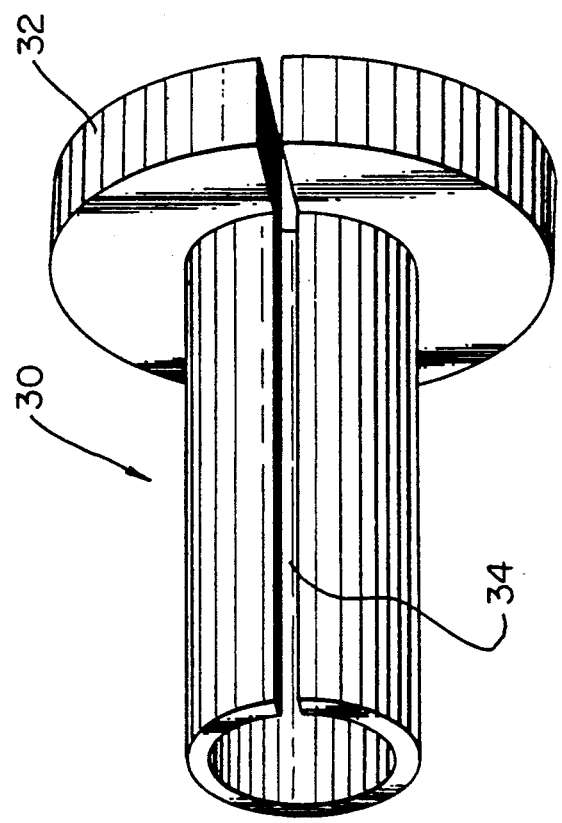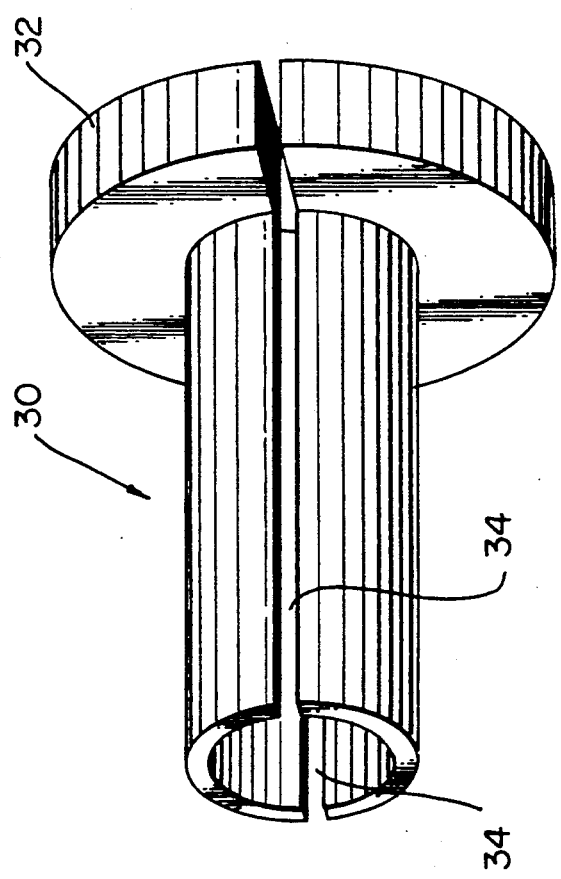

ELECTRICALLY INSULATING PIPE COUPLING APPARATUS

BRIEF DESCRIPTION OF THE INVENTION

This invention relates in general to pipe fittings used to secure sections of pipe together. More particularly, this invention relates to pipe fittings which couple together sections of electrically heated pipe while electrically isolating the individual sections.

BACKGROUND OF THE INVENTION

Manufacturing processes using chemicals, in either gaseous or liquid form, often require that the chemical flow be metered. Metering of a liquid chemical is complicated, since temperature must be controlled. This often involves controlled heating of the pipe sections downstream from the source to prevent freezing or boiling or to prevent condensation of an evaporated liquid. Similarly, pipe sections carrying gaseous chemicals which have been heated at the source must be heated to maintain the gas temperature.

The heating of the pipe sections is in itself not difficult. One relatively easy method of heating is to treat the pipe as a heating element through which an electrical heating current is passed. Stainless steel, a preferred metal in the construction of pipe sections for handling gaseous chemicals, has electrical properties similar to those found in electrical heating elements.

A major problem associated with the heating of the pipe sections by the application of a current is that the section must be electrically isolated. Nonconductive pipe elements, such as glass or ceramics, may not be used to electrically isolate the heated pipe because of the danger of breakage. Non-metallic connecting tubes and hoses have several disadvantages including lower mechanical strength, thermal limitations, and the risk of introducing contaminants. Additionally, a proper junction between metals and nonmetals is hard to achieve because of the introduction of dead space, virtual leak, and other undesirable compromises.

A gas line isolator, described in U.S. Pat. No. 4,602,809 to Ross et al. electrically isolates two conductive tubing sections using complementary coupling members which are rigidly attached to the tubing and separated by a dielectric spacer. U.S. Pat. No. 4,519,634 to Hand illustrates a pipe fitting which couples a natural gas pipe line to a building pipe line while insulating the metallic casing of the gas line from any electric current passing through the building line. U.S. Pat. Nos. 3,574,357 and 4,284,297 are exemplary of pipe fittings incorporating thermal insulation.

The pipe fittings of Ross and Hand couple together and electrically isolate adjoining pipe sections. However, rigidly attaching the coupling members to the pipe sections creates various problems when used on pipelines which transport metered chemicals. A pipe fitting which avoids these problems is highly desirable.

Since the coupling members are rigidly attached to the pipe, any torsional stress introduced during coupling will affect the pipe sections by reducing the working life of the components. This also makes the assembly and maintenance of the pipe fitting more difficult. Using coupling members which may be moved along the pipe section would reduce the stresses introduced to the pipe section, and would facilitate installation and maintenance of the pipe fitting.

Rigidly connecting the coupling members to the pipe sections by brazing risks the introduction of contaminants from flux residues to the chemicals being carried by the pipe line. The flux residues may also collect at the juncture between the pipe sections, permitting leakage of chemicals from the pipe line. Movable coupling members, which are not mounted to the pipe section, would avoid this problem.

When the coupling members are rigidly attached to the pipe sections, some axial displacement is necessary to separate the pipe sections. In the tightly spaced, complex pipe lines used to transport chemicals, being able to separate the pipe sections by radial displacement is of particular advantage. Movable coupling members would facilitate radial displacement.

The insulating material used to provide electrical isolation between the pipe sections will wear before the metallic components and need to be replaced. When the coupling members are rigidly attached to the pipe sections, this may involve completely disassembling the pipe fitting. Thus, using an insulating component which may be replaced without removing the pipe fitting would facilitate maintenance and increase the working life of the pipe fitting.

OBJECTS AND SUMMARY OF THE INVENTION

Accordingly, it is a primary object of this invention to provide an electrically insulating coupling apparatus which joins two sections of pipe together with coupling members which move along the pipe sections.

A further object of this invention is to provide an electrically insulating coupling apparatus which allows the separation of the joined pipe section by radial displacement.

Another object of this invention is to provide a coupling apparatus wherein the introduction of contaminants during assembly is minimized and the risk of leakage is reduced.

An additional object of this invention is to provide an insulating coupling apparatus wherein the insulating components may be easily replaced without removing the coupling apparatus from the coupled pipe sections.

A more general object herein is to provide an insulating coupling apparatus which is simple to manufacture and easy to assemble.

In summary, the invention is particularly suitable for joining together and electrically isolating sections of pipe which are heated by the application of a current thereto. The electrically insulating pipe coupling apparatus of the present invention modifies a commercial pipe fitting to provide an electrically isolated connection between two pipe sections. The apparatus includes first and second extension members, a nonconductive spacer, an insulating sleeve, and first and second complementary coupling members.

Each extension member has two ends, one of which is adapted for attachment to a section of pipe, the other having an integral flange extending radially outward from the body of the extension member. The two extension members are positioned such that the integral flange of the first extension member opposes that of the second. An annular sealing bead protrudes from the opposing surfaces of each integral flange.

A sleeve, which has an insulating flange formed at one end, is mounted on the first extension member. The insulating flange extends radially outward and abuts the integral flange. In an alternative embodiment, the insulating sleeve has a longitudinal division to facilitate replacement. The nonconductive spacer is positioned between the opposing integral flanges, separating and electrically isolating the two extension members.

The first coupling member is slidably mounted on the insulating sleeve, while the second coupling member is slidably mounted on the second extension member. The two coupling members join together to compress the annular sealing beads into the nonconductive spacer. Thus, an electrically insulated seal between the two sections of pipe is formed.

Additional objects and features of the invention will be more readily apparent from the following detailed description and appended claims when taken in conjunction with the drawings.

BRIEF DESCRIPTION OF THE DRAWINGS

FIG. 1 shows an electrically insulated coupling apparatus in accordance with the invention installed on a pipeline.

FIG. 3 shows a frontal perspective view of an alternate form of an insulating sleeve in accordance with the invention.

FIG. 4 shows a frontal perspective view of another form of an insulting sleeve in accordance with the invention.

DETAILED DESCRIPTION OF THE INVENTION

Figure 2:
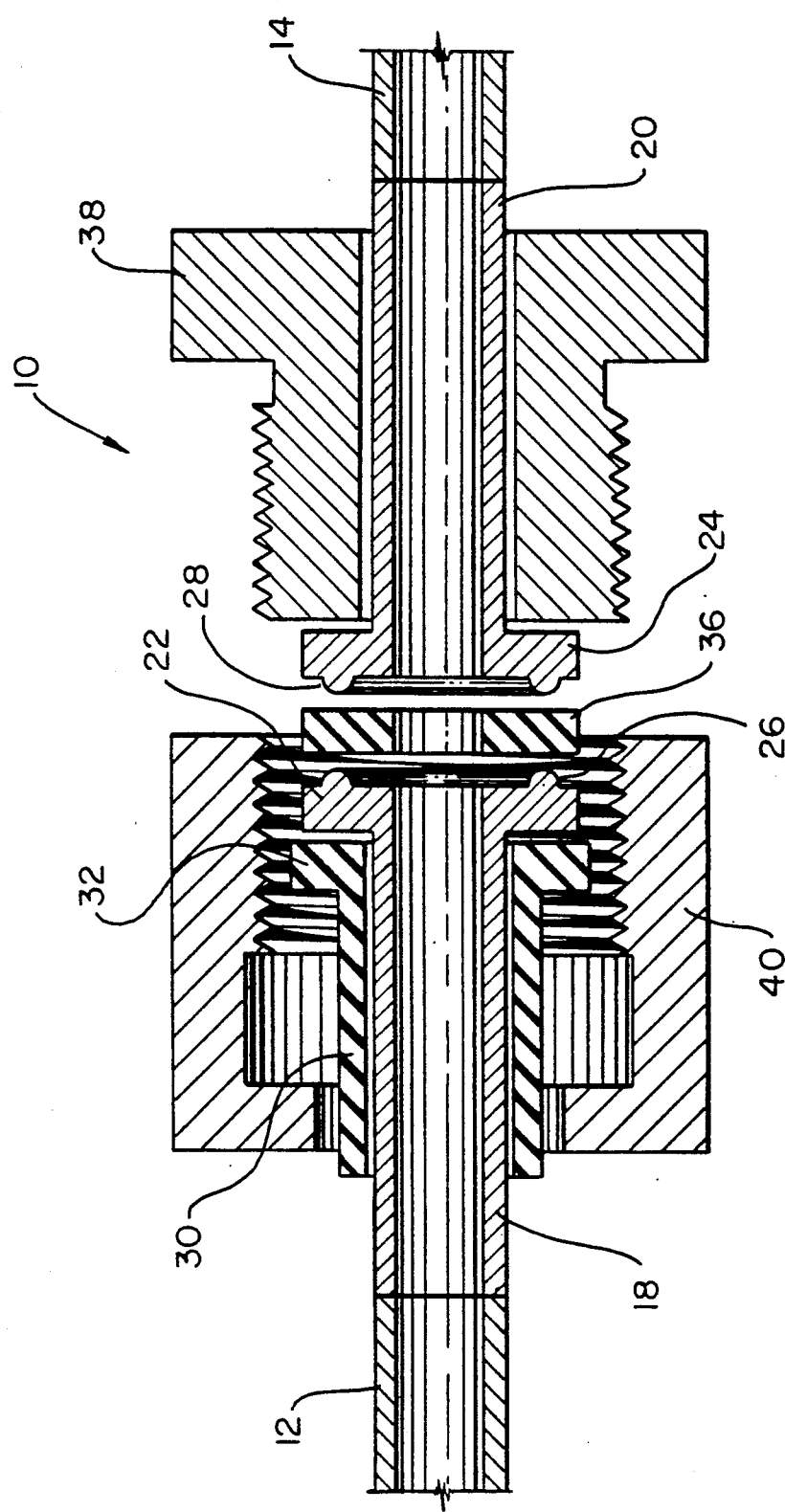
FIG. 2 shows an exploded cross-sectional view of an electrically insulated coupling apparatus in accordance with the invention.

Reference will now be made in detail to the preferred embodiment of the invention, which is illustrated in the accompanying figures. Turning now to the drawings, wherein like components are designated by like reference numerals throughout the various figures, attention is directed to FIG. 1.

An electrically insulating coupling assembly 10 incorporating the present invention is schematically shown in FIG. 1. Coupling assembly 10 is mounted between and joins pipe sections 12 and 14, electrically isolating the pipe sections from one another. A heating apparatus connected to leads 16 passes an electric current through pipe section 12. Pipe section 14 is electrically insulated from pipe section 12, which is heated by the current. In an alternative embodiment, pipe section 14 can also be heated by the passage of a current. Coupling assembly 10 would then electrically isolate the separately heated pipe sections.

An exploded cross-sectional view of coupling assembly 10 mounted to pipe sections 12 and 14 is shown in FIG. 2. One end of extension members 18 and 20, which are secured as by welding, brazing, or the like to pipe sections 12 and 14, respectively, project from the ends or the pipe sections and carry the other components of the coupling assembly. The other end of extension member 18, 20 is provided with integral flange 22, 24, respectively. An annular sealing bead 26, 28 protrudes from the surface of each of the flanges 22, 24. As illustrated, when extension members 18 and 20 are mounted to the pipe sections, annular sealing bead 26 opposes annular sealing bead 28.

An insulating sleeve 30, formed with an insulating flange 32 is mounted on extension member 18. Insulating flange 32 abuts integral flange 22. Nonconductive spacer 36 is positioned between extension members 18 and 20. Coupling member 40, which is slidably mounted on extension member 18, works together with coupling member 38, which is slidably mounted on extension member 20, to couple the extension members together. When coupling members 38, 40 are threadedly secured together by way of interconnecting threads, integral flanges 22 and 24 are drawn together, compressing annular sealing beads 26 and 28 into nonconductive spacer 36.

Insulating flange 32 separates coupling member 40 from integral flange 22, electrically isolating coupling members 38 and 40 from extension member 18. Nonconductive spacer 36 separates and electrically isolates extension member 18 from extension member 20. The nonconductive spacer is of sufficient thickness to maintain the electrical isolation between the annular sealing beads and to provide a seal which prevents the leakage of chemicals from the pipeline.

Pipe sections 12 and 14 are coupled together by twisting coupling members 38 and 40 about insulating sleeve 30 and extension member 20 in opposite directions. Since both coupling members 38 and 40 move when being tightened together, the amount of stress introduced to the pipe sections by the assembly of coupling assembly 10 is reduced. This facilitates the installation and maintenance of the coupling assembly.

Integral flanges 22, 24 are not mounted in place using methods such as brazing, but are integrally formed as part of extension members 18, 20. Coupling members 38, 40 are slidably mounted on the extension members, and not rigidly attached. These two features of this invention substantially reduce the risks of introduction of contaminants into the juncture between the extension members. This improves the seal between the integral flanges and the nonconductive spacer to prevent the leakage of chemicals from the pipeline.

When disassembling the coupling assembly, coupling members 38, 40 are disengaged and moved away from integral flanges 22, 24. Annular sealing beads 26, 28 are then separated from nonconductive spacer 36. Extension members 18, 20 may thus be separated by radial displacement. Coupling assembly 10 is therefore ideally suited for use in complex piping systems with limited working space.

An alternative embodiment of an insulating sleeve of this invention is shown in FIG. 3. In this embodiment, insulating sleeve 30 is formed having a narrow slot 34 beginning at insulating flange 32 and continuing through the body of the insulating sleeve. Narrow slot 34 provides an opening which may be spread to install insulating sleeve 30 on extension member 18. The insulation sleeve may be replaced without removing extension member 18 from pipe section 12, thus facilitating the maintenance of the coupling assembly. In another embodiment, FIG. 4, insulating sleeve 30 is formed in two halves to further facilitate installation or replacement without removing extension member 18 from pipe section 12.

In the preferred embodiment, both the pipe sections and the extension members are constructed of stainless steel. The insulating components, the insulating sleeve and the nonconductive spacer, are formed of a plastic such as Vespel. Other materials with similar properties may also be incorporated.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably with out departing from the basic principles of the invention.

What is claimed is:

1. A coupling apparatus for securing together and electrically isolating pipe sections comprising:
   a) first and second extension members each having first and second ends, said first end being adapted for attachment to said pipe section and said second end having an integral flange extending radially outward from said pipe section, said integral flange of said first extension member being positioned facing said integral flange of said second extension member, said first and second integral flanges each having an annular sealing bead protruding from the surface thereof;
   b) an electrically insulating sleeve mounted around said first extension member and having an insulating flange which extends radially outward from said insulating sleeve formed at one end such that, when said insulating sleeve is positioned on said first extension member, said insulating flange abuts said integral flange;
   c) a nonconductive spacer positioned between said first and second integral flanges and formed to receive said sealing beads of said first and second extension members, said spacer being of substantially uniform thickness in the direction of said facing flanges and being of sufficient thickness to form a seal with said sealing beads and to electrically isolate said first extension member from said second extension member; and
   d) first and second complementary separable coupling members, said first coupling member being slidably mounted on said insulating sleeve on said first extension member, said second coupling member being slidably mounted on said second extension member, said first and second coupling members each being individually movable about a corresponding one of said extension members, said coupling members joining together to move each of said sealing beads into compressive contact with said spacer to deform said spacer and thereby form a seal along the area of engagement, thereby sealingly engaging said first extension member to said second extension member.

2. The nonconductive coupling apparatus of claim 1 wherein said insulating sleeve includes a narrow longitudinal slot thereby providing means for removing said insulating sleeve from said first extension member once said first extension member is attached to said pipe section.

* * * * *